(12) United States Patent
Hou

(10) Patent No.: US 9,760,151 B1
(45) Date of Patent: Sep. 12, 2017

(54) DETECTING DAMAGE TO AN ELECTRONIC DEVICE DISPLAY

(75) Inventor: Steven Xuefeng Hou, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 13/430,371

(22) Filed: Mar. 26, 2012

(51) Int. Cl.
*G06F 1/32* (2006.01)
*G06F 3/041* (2006.01)
*G06F 3/042* (2006.01)

(52) U.S. Cl.
CPC .......... *G06F 1/3231* (2013.01); *G06F 3/0414* (2013.01); *G06F 3/0421* (2013.01); *G06F 2203/04105* (2013.01); *Y02B 60/1289* (2013.01)

(58) Field of Classification Search
CPC ......... G06F 2203/04105; G06F 3/0414; G06F 3/0421; G06F 1/3231; G06F 3/0346; G06F 3/0481; G06F 3/0412; G06F 3/0416; G06F 3/04883; Y02B 60/1289; G02F 1/13338
USPC ..... 340/540, 546, 932.2, 435; 345/173, 175, 345/179, 87, 102, 76, 156, 163, 684, 169, 345/211, 589, 630; 178/18.01–18.11; 715/763, 702, 711, 863, 849
See application file for complete search history.

(56) References Cited

U.S. PATENT DOCUMENTS

| | | | | |
|---|---|---|---|---|
| 2005/0219223 | A1* | 10/2005 | Kotzin | G06F 1/1626 345/173 |
| 2007/0296688 | A1* | 12/2007 | Nakamura | G02F 1/13338 345/102 |
| 2008/0122796 | A1* | 5/2008 | Jobs | G06F 3/0488 345/173 |
| 2008/0158172 | A1* | 7/2008 | Hotelling | G06F 1/3231 345/173 |
| 2008/0162996 | A1* | 7/2008 | Krah | G06F 1/3203 714/27 |
| 2008/0273013 | A1* | 11/2008 | Levine | G06F 3/0421 345/173 |
| 2010/0060611 | A1* | 3/2010 | Nie | G06F 1/3203 345/175 |
| 2012/0075327 | A1* | 3/2012 | MacKenzie | G06F 3/04883 345/589 |
| 2012/0105358 | A1* | 5/2012 | Momeyer | G06F 3/0414 345/174 |

* cited by examiner

Primary Examiner — Mirza Alam
(74) Attorney, Agent, or Firm — Lee & Hayes, PLLC

(57) ABSTRACT

Detecting potential damage to a touch sensitive display of an electronic device as a result of contact with one or more other objects. Different characteristics associated with contact of the display by object(s) can be determined. Based upon one or more of these characteristics, the electronic device can determine if potential damage to the display is occurring. If so, the electronic device can trigger an alert warning of the potential damage. The characteristics can include the number of contacts/time, the frequency of contacts, the duration of each contact, the area of contact, the number of simultaneous contacts, and/or the intensity of the contact(s). Other factors indicating that the electronic device is not in use, such as the light intensity proximate to the electronic device, the orientation, movement, and/or location of the electronic device, can be detected to confirm that the alert should be issued.

35 Claims, 8 Drawing Sheets

DETECTING DAMAGE TO AN ELECTRONIC DEVICE DISPLAY

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with an increasing proliferation of devices to consume that media content, finding ways to enhance user experience continues to be a priority.

Electronic devices like those noted above are often transported within a bag or backpack. The displays of such electronic devices may be scratched or damaged by contact with other objects such as keys, cellular telephone, or a device charger, if the objects are carried in the same compartment of a bag or backpack as the electronic device. While in the bag, the electronic device display may be repetitively subjected to impacts during transport. Repetitive contacts between the objects and the display can occur due to the movement when the bag or backpack is being carried by a user. The contacts can also occur while the bag or backpack is placed in an overhead baggage rack of an aircraft or in the luggage compartment of a vehicle. When the electronic device is subsequently taken out of the bag or backpack, the user may be surprised to find that the display of the device has sustained damage, or that the electronic device will no longer operate as a result of visually undetectable damage to the display.

BRIEF DESCRIPTION OF THE DRAWINGS

Various aspects and attendant advantages of one or more illustrative embodiments and modifications thereto will become more readily appreciated as the same becomes better understood by reference to the following detailed description, when taken in conjunction with the accompanying drawings. In the figures, the left-most digit(s) of a reference number identifies the figure in which the reference number first appears. The use of the same reference numbers in different figures indicates similar or identical items or features.

DETAILED DESCRIPTION

Overview

Portable electronic devices, such as cellular telephones, computer tablets, personal data assistants (PDAs), and electronic book (eBook) readers are generally designed to be relatively rugged and resistant to damage. Most such devices include a display, which is perhaps one of the more easily damaged portions of portable electronic devices. The display on smaller electronic devices, such as cellular telephones or smart phones is typically sufficiently small in area to be relatively resistant to moderate impacts by other objects. However, the larger displays of tablets and eBook readers can more easily become cracked, scratched, or otherwise damaged as a result of impacts by other objects, particularly repetitive impacts by objects having sharp edges that can scratch the display, or by heavier objects that can crack the display. Some damage to a display may not be visually evident, yet can prevent the electronic device from operating properly.

Figure 1A:
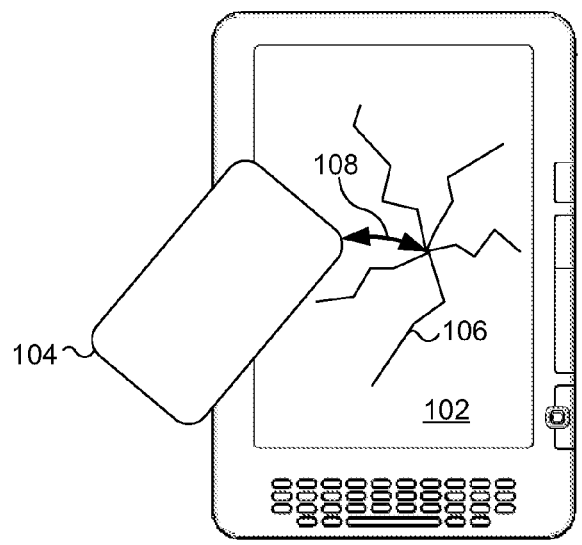
FIG. 1A is top plan view of an illustrative electronic device having a touch sensitive display that has been damaged by repeated contact of the display by another object.

FIG. 1A shows an illustrative electronic device 100 having a display 102 that has been visibly damaged as a result of one or more impacts by an object 104. When transported with electronic device 100, object 104 may repeatedly move along a path 108 to strike display 102, resulting in a crack 106 forming in the display. Use of a protective film adherently attached to display 102 would likely not protect it from such damage. Where many such impacts have occurred between object 104 and display 102, the likelihood of cracking the display is probably greater, since repeated impacts at the same location on the display can weaken it until it fails. Also, the intensity of the impacts may not initially have been great enough to crack or damage the display. Accordingly, if the user is alerted about object(s) impacting the display of the electronic device before the display became cracked or damaged, the user might take appropriate steps to protect the display by removing the electronic device from the environment in which display 102 is contacted by object 104. Further, if the user were earlier alerted to the potential damage of the display caused by objects impacting the display, the user might have purchased an appropriate cover to protect the display while it is being transported with other objects.

As suggested above, experience has shown that damage to the display of an electronic device is more likely to occur when the electronic device is carried within a bag, backpack, or other enclosing volume, along with other objects. Indeed, it is very common for an electronic device having a display that can be damaged to be placed in a bag or backpack with one or more other objects, such as a cellular phone, or charger.

Figure 1B:
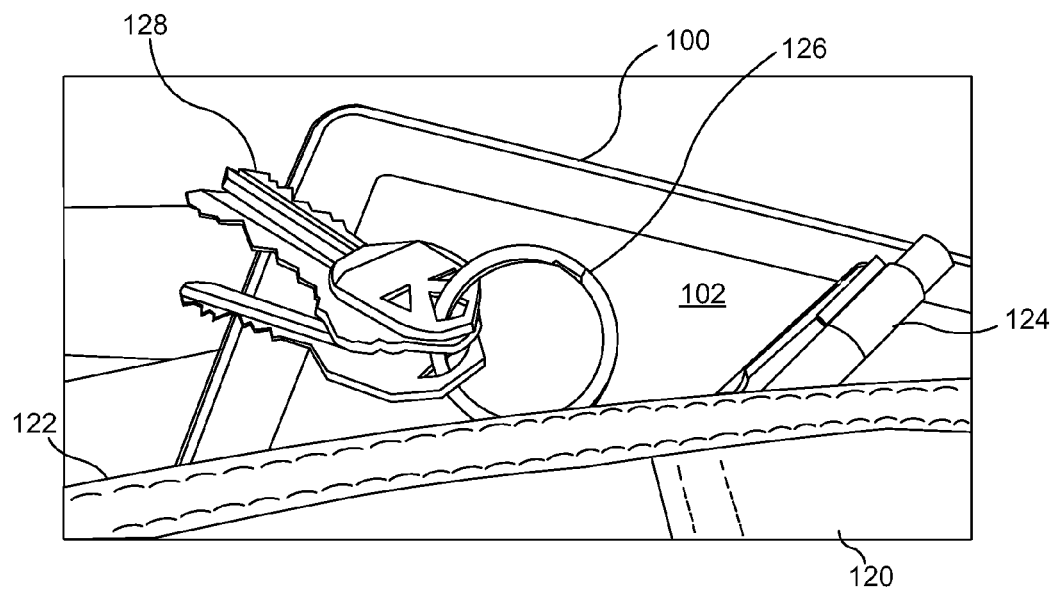
FIG. 1B is an isometric view illustrating the illustrative electronic device of FIG. 1A within the pocket of a backpack (partially shown), along with a plurality of other objects that might potentially damage the display of the electronic device when the backpack is transported, movement of the backpack causing the other objects to contact the display of the electronic device.

By way of example, FIG. 1B illustrates a pocket 122 of a backpack 120 in which electronic device 100 has been placed, along with an ink pen 124 and a key ring 126 holding three keys 128. In this example, display 102 of electronic device 100 can readily be scratched by keys 128 as a user transports backpack 120, due to the repetitive contact between keys 128 and display 102. Also, ink pen 124 may repeatedly impact the display while the backpack is being carried within the luggage rack of an aircraft or train, or in the trunk of an automobile, since the backpack may be moved about and impacts against the ink pen can be transmitted to the display. Even the continuing motion of a user walking and carrying backpack 120 can cause damaging contacts between the other objects and the display of electronic device 100. When the user arrives at a destination and withdraws the electronic device from the backpack in which it was transported, the user will likely be surprised to find that damage to the display has occurred. If the damage to the display is not visually evident, the user may even be more surprised if an attempt to power on electronic device 100 fails due to the damaged display.

The displays on many types of portable electronic devices, particularly larger displays such as those on eBook readers, are touch sensitive and may respond either to the user touching the display with a fingertip, a hand or other part of the body, or with a stylus. Such displays can employ a variety of different techniques for sensing when the user has touched the display. Examples of the various types of touch screen technologies include resistive sensors, surface acoustic wave (SAW) sensors, capacitive sensors, infrared sensors, optical imaging, dispersive signal technology (using piezoelectric signals), and acoustic pulse recognition. Some touch screen displays combine different types of sensors, enabling the display touch sensor to distinguish between the rather greater intensity of infrared energy detected when an animate object, such as a user's finger or hand touching the display, and the lower intensity infrared energy detected when an inanimate object, such as a stylus, touches the display.

For any display that includes a touch sensor, the present approach can detect potential damage to a display that might be caused by one or more objects contacting the display at a time when the user is not actively employing the electronic device for its intended purpose. When an electronic device is being used, the touch sensor will be activated each time that the user touches the display to make a selection, cause a control action, enter an input, or for some other purpose. While responding to such user input, the electronic device can be considered to be operating in an active mode. During the short periods of time between the user touching the display with a finger, hand, or stylus, the display may enter an idle mode, but remain fully operational. However, if the electronic device does not received any input for a predefined period of time, e.g., for 10-15 minutes, it typically will enter a suspend mode of operation. On some electronic devices, the user can also manually activate a control to put the electronic device in the suspend mode. While in the suspend mode of operation, a portion of the system becomes inoperative, and the electronic device then uses a much smaller amount of electrical power, so that its battery supply lasts longer. In many electronic devices, the processor exits the suspend mode in response to a touch input on the display, or may instead, exit the suspend mode when the user activates a control intended for that purpose.

Most electronic devices will be in the suspend mode of operation while being transported, since the user would not then be employing the electronic device for its intended purpose and would not provide any input to the touch sensor of the display. However, the interrupt generated by the touch sensor can still be active in the suspend mode. For electronic devices that automatically exit the suspend mode upon detecting the user touching the display, it follows that the touch sensor of the display responds to a contact of the display while the electronic device is in the suspend mode. For electronic devices that must be manually awakened from the suspend mode by the user activating a control for that purpose, the touch sensor of the display can nevertheless remain active and be responsive to touch contacts by another object. The signal produced by the touch sensor either while in the suspend mode or after exiting the suspend mode can be employed for determining whether contact with the display by one or more objects is occurring that may potentially cause (or already have caused) damage to the display. To make that determination, one or more characteristics associated with the contact of the display by one or more objects can be determined and compared to predefined constants to decide whether potential damage to the display may be occurring as a result of such contacts. But, since the touch sensor should not incorrectly determine that the user's touch with a finger, hand, or stylus might cause damage to the display, other indications may also be employed to determine that the contact of the display is not being intentionally caused by the user, but is instead being caused by the electronic device being moved with one or more other objects that are unintentionally contacting the display. If so, the processor is justified in warning the user of the potential damage to the display.

Once the electronic device has responded to the touch of the display by one or more objects and has determined that these contacts are likely not intentionally occurring during the use of the electronic device for its intended purpose, the electronic device should alert the user of the potential damage to the display that may occur, or may already have occurred because of such contacts. The user might be alerted by the electronic device providing a message on the display, and/or an audible alert signal that attracts the user's attention, causing the user to check the electronic device and view the textual alert. Alternatively, the user may be alerted by a text or chat message sent to a different electronic device, or by an email sent to the user's account that can be received on another electronic device. It would be desirable that the user be alerted of the potential damage due to contact with the display by one or more other objects, to enable the user to remedy this condition before actual damage to the display occurs. Further, when alerted to the potential damage to the display, the user might also be directed to a webpage or site where the user can purchase a cover that will protect the display of the electronic device from such damage.

Illustrative Architecture

Figure 2:
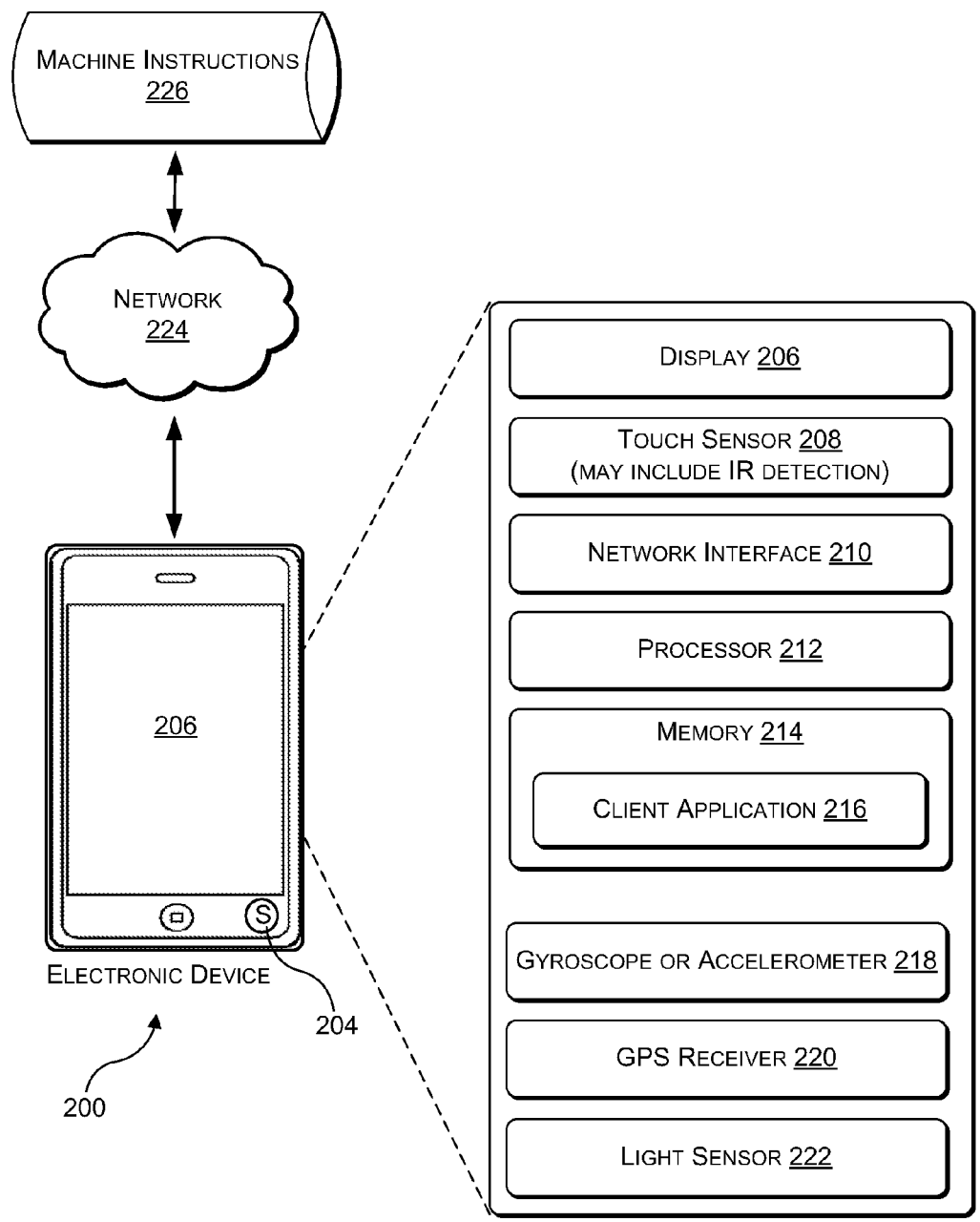
FIG. 2 is a schematic illustration showing an illustrative electronic device and at least a portion of its functional components, as well as other components that can optionally be employed.

An illustrative electronic device 200 and at least some of its functional components are illustrated in FIG. 2. Electronic device 200 includes a touch sensitive display 206 that has a touch sensor 208. The electronic device can optionally include a control 204 that is activated by a user to manually place the electronic device into the suspend mode of operation, from which the device may exit when the user again presses control 204, or if the user provides an input to the touch sensor of the display. While not required, touch sensor 208 may employ infrared detection capability and may thereby be able to distinguish between the touch by animate objects, such as a finger or hand of the user, and the touch by inanimate objects. Inanimate objects can include a stylus as well as objects that accidently or inadvertently contact the display, such as object(s) (not shown in the Figure) that may be carried next to electronic device 200 in a bag in which it is being transported. Also included is a network interface 210, which can enable electronic device 200 to communicate with a network 224 or with another computing device (not shown) through a hardwire interface, such as a universal serial bus (USB) port, and/or may provide wireless communication with the network or computing device(s) via Bluetooth, Wi-FI, Ethernet, infrared (IR), cellular networks, radio, or other form of communication. Communication with network 224 in this manner may be employed to enable electronic device 200 to download machine executable instructions for implementing any of the illustrative embodiments for detecting potentially damaging contact by object(s) with display 206 from one or more non-transitory tangible storage media on which the instructions are stored, for example, on a remote hard drive or optical storage media.

One or more processors 212 are included in illustrative electronic device 200, for executing machine executable instructions that may be stored in a memory 214 (for example, after being downloaded over network 224), enabling electronic device 200 to carry out a variety of different functions, including executing client applications 216 or implementing the illustrative embodiments to detect potentially damaging contact of the display by other objects that are discussed below. The basic functions of electronic device 200 are determined by an operating system executed when the electronic device is energized, based upon instructions that may also be stored in memory 214. It should be noted that the term "processor" as used herein, in the drawings, and in the claims that follow is intended to encompass a single processor, multiple processors, and processor(s) with multiple cores.

While the approach described herein may be used in determining whether objects are contacting the relatively larger touch sensitive display of an eBook reader, the approach described herein is not in any way limited to that type of electronic device. Instead, potential damage to the touch sensitive display of other types of electronic devices by contact with one or more other objects can clearly be detected by one or more of the illustrative procedures described herein. Thus, this approach is also useful, for example, in detecting the potentially damaging contact of objects with a touch sensitive tablet, or a touch sensitive display of a laptop that is left open when the laptop is placed in bag or backpack where it can be contacted by one or more other objects. These are just a few of the types of electronic devices that can benefit from the present illustrative approaches disclosed herein.

One or more other functional components may optionally be incorporated in illustrative electronic device 200 to detect a condition that may be inconsistent with use of the electronic device for an intended purpose by a user. The other functional components can include a gyroscope or accelerometer 218, which can produce an output signal indicating the orientation, and/or movement of electronic device 200, a global positioning system (GPS) receiver 220, which can receive global positioning system signals from overhead satellites to determine the location, motion, and/or altitude of the electronic device, and/or a light sensor 222, which can detect a light level proximate to the electronic device, to determine if display 206 would be readily visible (or legible) to the human eye, since when an electronic device is carried within a bag, the illumination level is likely to be below that required to use an electronic device in its intended manner. If the light intensity is thus below a predefined constant level, it is then likely that any contacts of display 206 detected by touch sensor 208 are likely to be by objects not manipulated by the user.

Illustrative Processes

Several different illustrative processes for determining if contact of the display of an electronic device by one or more other objects is potentially damaging the display are discussed below. It is emphasized that any of these different illustrative approaches may be employed alone, or that two or more may be combined to make the determination. Furthermore, it will be apparent to one of ordinary skill in the art how one or more of these different approaches might be combined in determining whether potential damage to the display is occurring by detecting the various different characteristics associated with the contact of the display by one or more objects and then comparing the characteristics against appropriate predefined constants.

Figure 3:
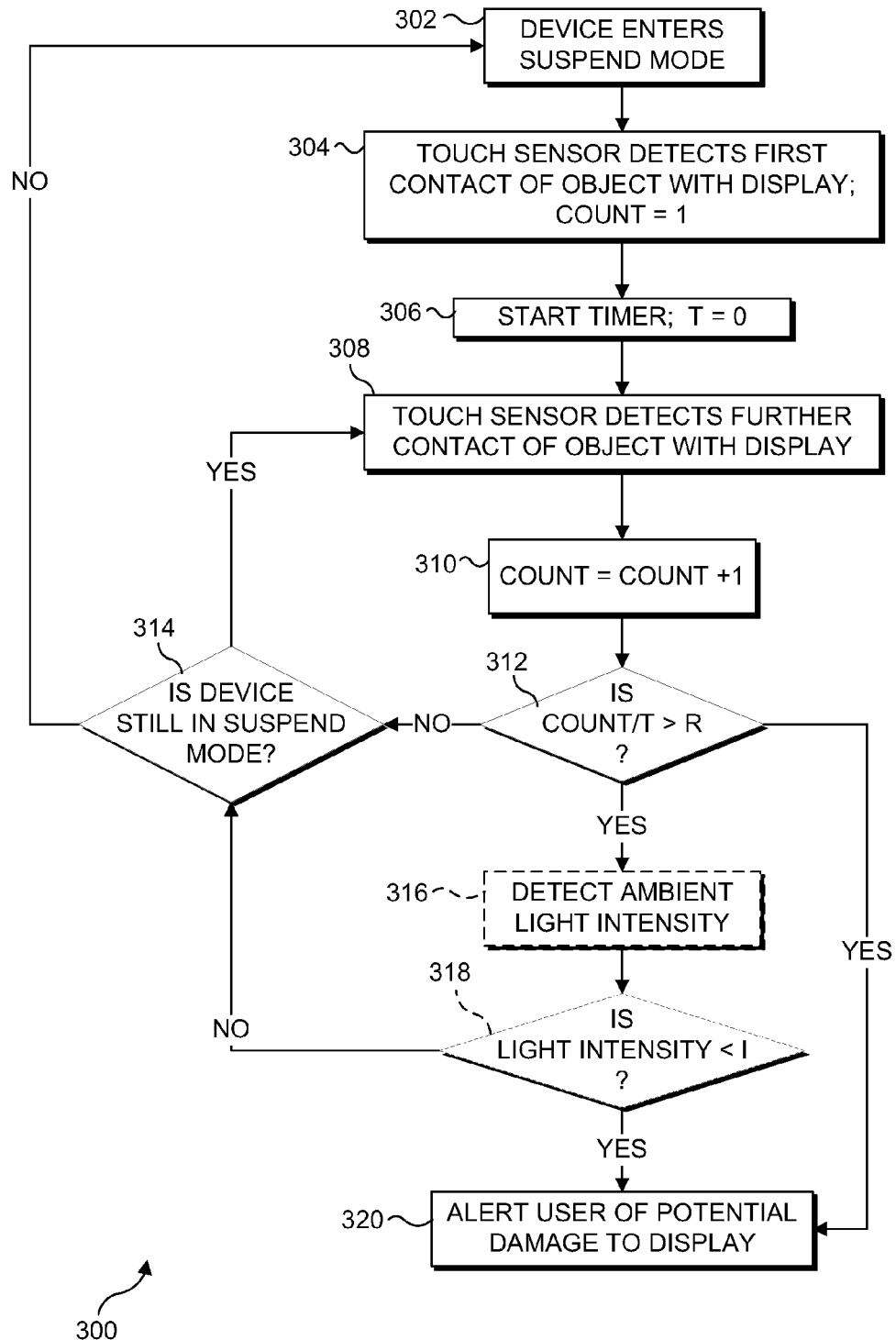
FIG. 3 is a flowchart illustrating the logic used in a first illustrative procedure for detecting potentially damaging contact(s) by other object(s) with the display of an electronic device, based upon the number of contacts occurring over time, i.e., a moving average of the number of contacts over time.

A flowchart 300 for detecting potentially harmful contact with the display of an electronic device by one or more objects illustrates the illustrative logic shown in FIG. 3. In this embodiment (with reference to a block 302) and in each of the other illustrative embodiments that are discussed below, the logic indicates that the electronic device has entered the suspend mode of operation. As discussed above, in some electronic devices, the user can manually cause the device to operate in the suspend mode, and in many electronic devices, the suspend mode is automatically initiated after a predefined period of time of inactivity has elapsed, during which no user input to the electronic device has been detected. However, it is herein emphasized that none of the illustrative approaches discussed herein specifically require that the electronic device be in the suspend mode when the electronic device detects potentially harmful contact with the display by one or more objects. Many electronic devices can enter a reduced power consumption state that is referred to as "a suspend mode" or into a mode that is substantially equivalent thereto. Furthermore, it is noted that even when in the suspend mode, the display touch sensor is still be able to respond to a touch or contact by one or more objects. Normally, although other functions that are operative in the active or idle mode are shut down when the electronic device is in the suspend mode of operation, the touch sensor can still generate an interrupt when such a contact occurs, and the processor(s) of the electronic device can respond to the interrupt produced by the touch sensor in response to a contact of the display by other objects, to determine whether the display may be damaged by the contact.

In a block 304, the touch sensor detects a first contact of an object with the display and in response, sets a variable COUNT equal to 1. Next, in a block 306, a timer starts, initializing a variable T equal to 0. In a block 308, the touch sensor may detect a further contact by an object with the display, and in response, a block 310 provides for incrementing the variable COUNT by 1, i.e., COUNT=COUNT+ 1. It should be apparent that if one or more objects are randomly contacting the display as a result of the electronic device and the object(s) being moved about, the number of such contacts over time may be greater than when a user normally touches the display with a finger, a hand, or a stylus while using the electronic device for its intended purpose. For example, if the electronic device is an eBook reader, the user reading a book on the device will contact the display to turn each page of the text being read once every two to three minutes. Accordingly, if the COUNT per unit time T that has elapsed since the timer started is greater than a predefined constant R, which is substantially greater than the number of contacts typically provided by a user over time (e.g., three contacts per minute), then it is likely that the display is being touched inadvertently by other objects being transported in the same space or volume with the electronic device and not by the user. The number of contacts of the display by one or more other objects over time that is determined in this manner is essentially a moving average. A decision block 312 would return an affirmative if the moving average is greater than R, i.e., if COUNT/T>R, and the logic might then advance to a block 320. Block 320 provides for alerting the user of potential damage to the display because of the contacts by the one or more objects with the display.

Conversely, if the response to decision block 312 is negative, a decision block 314 can determine if the device is still in the suspend mode. Since some electronic devices automatically exit the suspend mode when any contact with the display occurs, but then may automatically return to the suspend mode of operation after a period of inactivity, this decision block determines if such a device has thus been returned to the suspend mode after being awakened due to a contact with the display. If so, the logic returns to block 308, since touches that occur while the device is in the active or idle modes may be actually intended by the user as an input. But, if the device has subsequently returned to the suspend mode after exiting the suspend mode, the touch sensor can continue to detect further contacts, and if the number of contacts per unit time eventually exceeds the predefined constant R in block 312, the user will be alerted in block 320. If the electronic device does not automatically exit the suspend mode, or if it is not yet in the suspend mode of operation, the logic waits and proceeds back to block 302 after the electronic device enters the suspend mode of operation, before repeating the logic discussed above.

Since it is possible that a user may indeed have intentionally caused one or more contacts with the display over time, confirmation of the need to alert the user of possible damage to the display would thus be useful to avoid false alerts. To provide such a confirmation, an optional block 316 can detect the light intensity using a light sensor, which can be included in the electronic device, as discussed above in connection with FIG. 2. A decision block 318 determines if the light intensity is less than a predefined constant I. This predefined constant I is selected to correspond to a level of illumination that is below that normally desirable to enable the user to comfortably view the display and/or operate the electronic device. If the light intensity is below the predefined constant I, it is unlikely that the contact(s) with the display were intentionally caused by the user touching the display with a finger, hand, or stylus. For many eBook readers, light is required to read text on the display, since there is no internal light source. For some types of electronic devices, ambient light may be required to view and thereby use a keyboard or to select input controls. Accordingly, if the response to decision block 318 is positive, the logic alerts the user in block 320, since it is more likely that the alert is justified because the electronic device would not normally be used at such low light intensity. Conversely, if the response in decision block 318 is negative, the logic proceeds with decision block 314, as discussed above.

It should also be noted that if the touch sensor can also detect infrared energy and thereby distinguish between the contact with the display by animate and inanimate objects, then the logic employed to accumulate COUNTS might only do so for contacts by inanimate objects and ignore contacts by animate objects. Even if such a touch sensor is provided with the display, it may nevertheless be helpful to confirm that the alert should be issued based on some other factor, such as the light intensity proximate to the electronic device.

Figure 4:
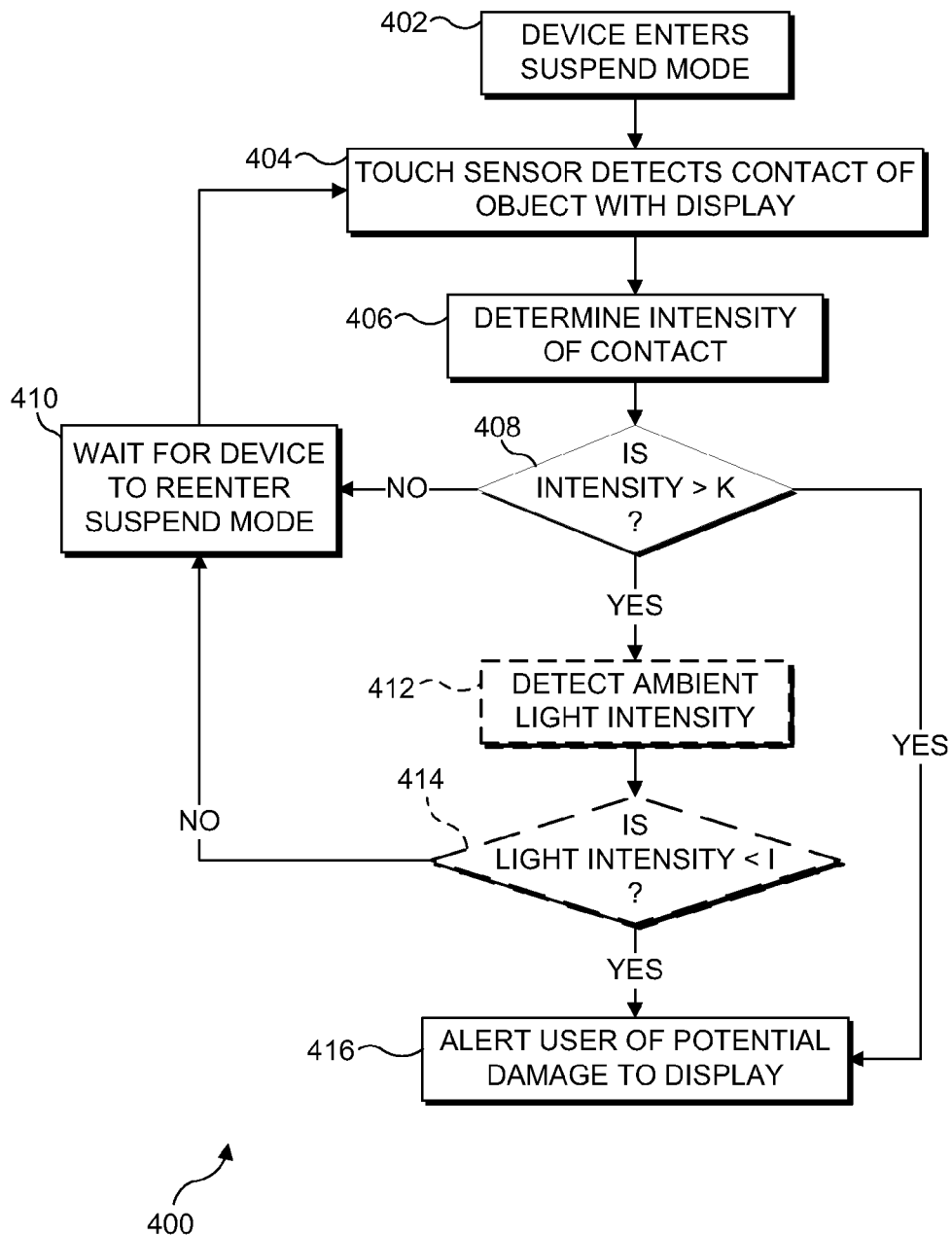
FIG. 4 is a flowchart illustrating the logic used in a second illustrative procedure for detecting potentially damaging contact(s) by one or more other objects with the display of an electronic device, based upon the intensity of the contact(s)

Some touch sensors can detect the intensity with which a touch sensitive display is contacted by an object. FIG. 4 employs this capability in a second illustrative embodiment for detecting potentially damaging contact of a display by one or more objects. Again, while not required, the electronic device is assumed to have entered the suspend mode in a block 402. In a block 404, the touch sensor detects the contact of an object with the display, and in a block 406, further determines the intensity of that contact. A decision block 408 determines if the intensity is greater than a predefined constant K. If so, the logic can immediately alert a user of the potential damage to the display of the electronic device in a block 416. Otherwise, if the response to decision block 408 is negative, the logic proceeds to a block 410, which waits for the device to reenter the suspend mode of operation. Again, it should be noted that the touch of the display by an object may cause the processor to automatically exit the suspend mode of operation and after a period inactivity has elapsed, the processor may reenter the suspend mode of operation. If the device is still in the suspend mode (or has reentered it), the logic returns to block 404 to wait until the touch sensor again detects an object contacting the display.

A block 412 optionally provides for a light sensor to detect the light intensity proximate to the electronic device, and a decision block 414 optionally determines if the light intensity is less than the predefined constant I. If so, it is likely that the user did not intentionally cause the display to be contacted by an object, with an intensity of the contact being greater than K, and the user can be alerted of the potential damage to the display as provided in block 416. If the light intensity is not less than I, so that the user might be expected to be able to use the electronic device in its intended manner (since the user may then have caused the contact with the display), then the logic loops back to block 410 to wait until the electronic device is again operating (or has remained) in the suspend mode. In this embodiment, the option of comparing the detected light intensity to the predefined constant I is less useful, since the value of K can be selected to be sufficiently high that it is unlikely a user would have intentionally contacted the display with a finger, hand, or other object with so much force, since such an impact would be excessive and likely viewed by the user as potentially damaging to the display. Even lower intensity contacts are still evidence of undesired contact with the display by another object if the value of K is substantially greater than the intensity of contact normally applied by the user when intentionally interacting with the touch sensitive display.

Figure 5:
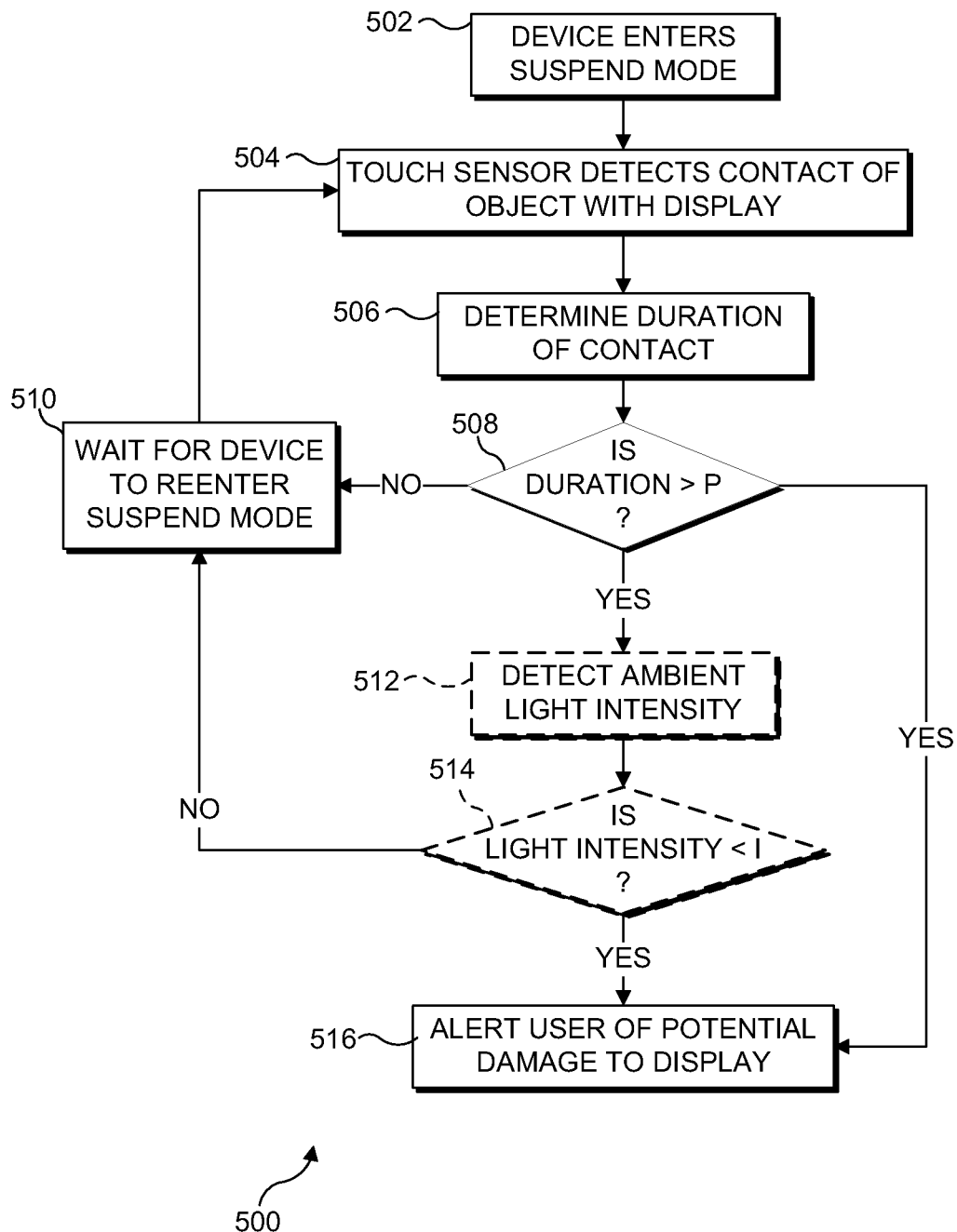
FIG. 5 is a flowchart illustrating the logic used in a third illustrative procedure for detecting potentially damaging contact by one or more other objects with the display of an electronic device, based upon the duration of the contact.

FIG. 5 is a flowchart 500 in which illustrative logic is illustrated for an embodiment that can determine whether a display has experienced potentially damaging contact with another object, based upon the duration of the contact. In typical uses of a touch sensitive display, the user briefly touches a portion of the display or applies a gesture to the display to provide a desired input. Accordingly, if an object contacts the display for a substantially longer period of time, it is likely that the object is not controlled by the user and might scratch or otherwise damage the display if it moves across the display while the contact is maintained during this longer duration.

This illustrative procedure for this embodiment begins at a block 502 in which the electronic device has entered the suspend mode of operation—either as a result of the electronic device not receiving any input for a predefined period of time or as a result of the user selectively manually causing the electronic device to enter the suspend mode by activating an appropriate control. A block 504 then provides that the touch sensor detects contact of an object with the display, and a block 506 further provides that the processor determines the duration of the contact. A decision block 508 determines if the duration is greater than a predefined constant P. This predefined constant can be selected empirically by measuring the longest period of time that a user normally contacts the display when providing an intended input and then setting P equal to some substantially longer period of time, e.g., 50% longer. If the response to decision block 508 is affirmative, a block 516 provides for alerting the user of a potentially damaging contact by an object with the display. Damage might occur, for example, if the sharp teeth of a set of keys (such as keys 128 in FIG. 1B) is contacting the display—particularly if relative motions between the keys and the display might result in the display being scratched. A negative response to decision block 508 leads to a block 510 to await the electronic device reentering the suspend mode, if it has not remained in that mode. The logic then loops back to block 504.

As before, another option to confirm that the objects touching the display are not controlled by the user and that the alert to the user should be provided is to detect the light intensity, as indicated in a box 512, and in a decision block 514, to determine if the light intensity is less than the predefined constant I. If so, the alert can be provided to the user, of the potential damage to the display resulting from the longer duration contact with the display by another object, as indicated in block 516. Otherwise, the logic loops back to block 510, and proceeds as discussed above.

Figure 6:
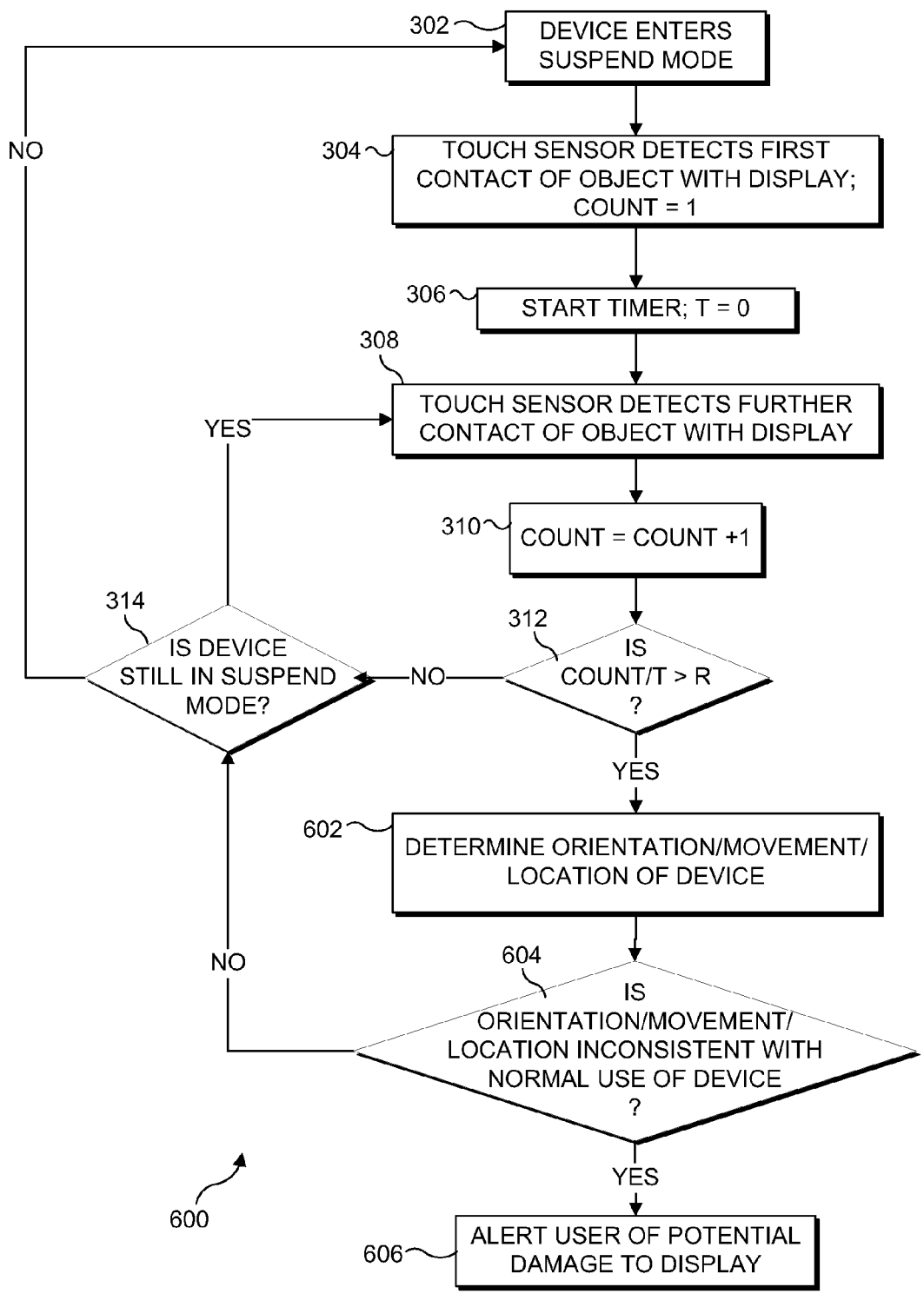
FIG. 6 is a flowchart illustrating the logic used in a fourth illustrative procedure for detecting potentially damaging contact by other objects with the display of an electronic device, in a manner similar to FIG. 3, but using an orientation, and/or movement and/or location of the electronic device to confirm whether potential damage to the display is occurring.

FIG. 6 is a flowchart 600 that shows illustrative logic for another illustrative embodiment to detect potentially damaging contact between the display of an electronic device and another object. This embodiment is generally similar to that of FIG. 3 and includes the same reference numbers for the blocks that are identical in each Figure. However, the illustrative embodiment of FIG. 6 also includes an alternative approach to confirm whether the alert should be provided to the user about potential damage to the display. Specifically, if the response to decision block 312 is affirmative, to indicate that the running average of COUNTS/ T>R, then a block 602 determines the orientation, and/or the movement, and/or the location of the electronic device. This determination can be implemented using one or more of a gyroscope, an accelerometer, and a GPS receiver that is included within the electronic device. For example, a gyroscope can be used to determine orientation and/or movement of the device, while an accelerometer can determine movement, and the orientation of the electronic device. A GPS receiver can determine the location of the electronic device in response to the GPS satellite signals received from satellites that are overhead at the time, and the location can also indicate the altitude of the electronic device.

Next, a decision block 604 determines if the orientation, and/or movement, and/or location of the electronic device is inconsistent with use of the electronic device for its normal intended purpose. For example, if the orientation of the electronic device is such that the display is facing down, it is unlikely that the user would be controlling any object(s) that have been contacting the display, since the display would normally be facing generally upwardly when the user is touching the display to provide an input. Also, if the electronic device is partially inverted, e.g., at about 90 degrees and moving, it is likely that the electronic device is being transported in a bag or backpack with other objects that have contacted the display. Motion can also indicate that the electronic device is being transported by the user while walking, which would be the case if the user is transporting the device in a bag or backpack, or can indicate that the electronic device is moving at a speed consistent with transport in a vehicle or in a train, or an aircraft—indicating that the electronic device may have been placed in a baggage rack or other baggage store on a vehicle and is not being used for its intended purpose. The location can also indicate whether the electronic device is disposed at the coordinates of an airport or train station, where it is more likely to be transported within a bag or backpack with other objects that have contacted the display. The GPS signal can determine altitude as part of the location, and thus, can determine if the electronic device is likely being transported in an aircraft flying at a high altitude. Although an electronic device can clearly be in use while within an aircraft or other vehicle that is moving, electronic devices are often stored for at least part of the time in a bag or backpack, for example, while an aircraft is on the runway and gaining altitude immediately after takeoff. Thus, the information related to location and altitude can be a further indication that the contact of the display is not being caused by the user, but instead, is the result of random contacts by other object(s) stowed in a common compartment of a bag or backpack. If it is determined that the orientation, and/or movement and/or location is inconsistent with normal use of the device, then at a block 606, the device may alert the user as discussed above. It should be noted that the logic of block 602 and decision block 604 can optionally be employed with any of the other illustrative embodiments discussed herein, either instead of or in addition to detecting the light intensity proximate to the electronic device and determining whether it is below that at which a user would normally use the electronic device.

Figure 7:
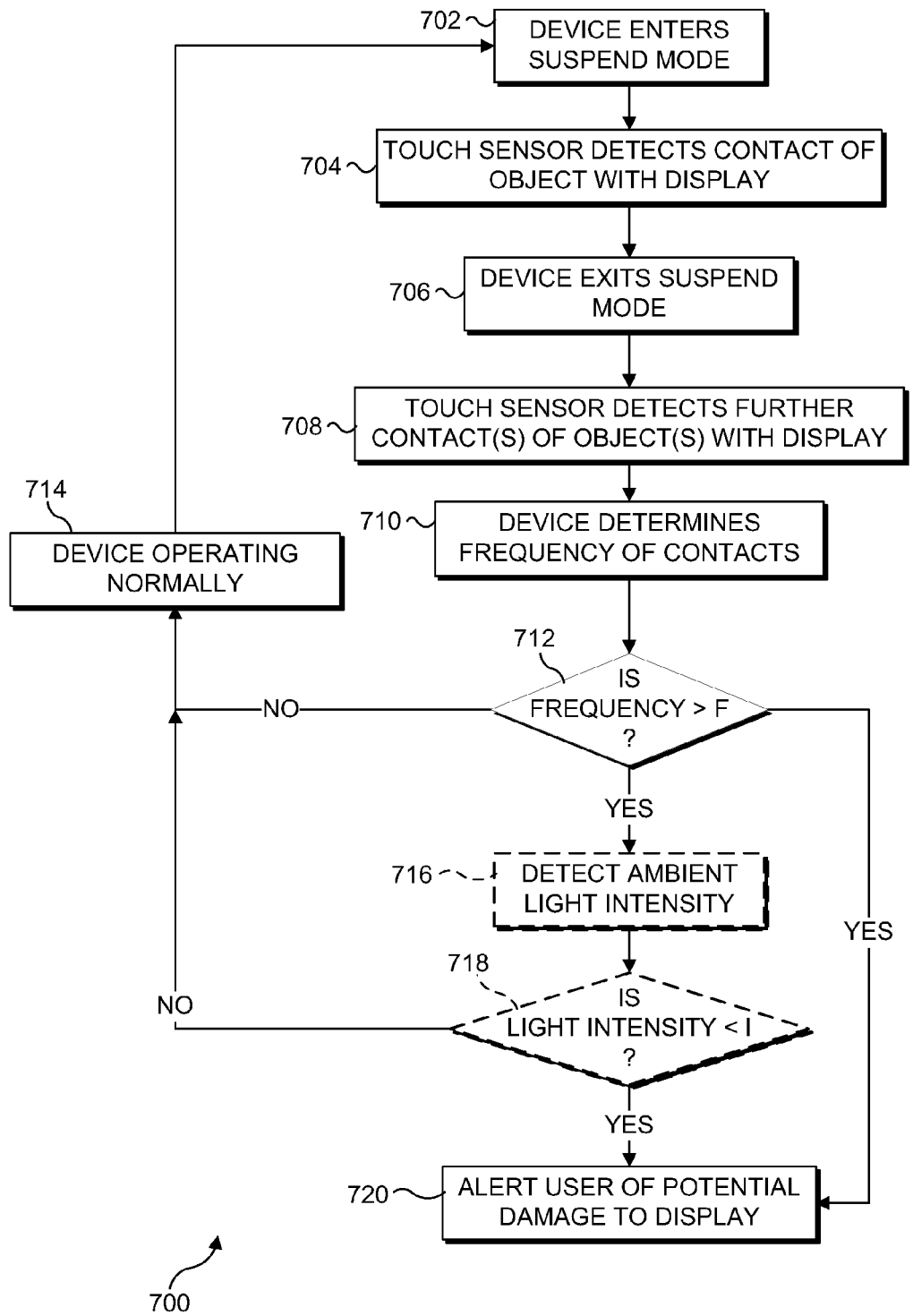
FIG. 7 is a flowchart illustrating the logic used in a fifth illustrative procedure for detecting potentially damaging contact by other objects with the display of an electronic device, based upon the frequency with which such contacts occur.

The illustrative embodiments discussed above in connection with FIGS. 3 and 6 determine a characteristic of the contacts by objects with the display. This characteristic corresponds to a moving average of the contacts over time. A related approach is indicated by a flowchart 700 in FIG. 7. In the illustrative embodiment of FIG. 7, the frequency of the contacts by one or more other objects with the display is determined and compared to a predefined constant F.

A block 702 indicates that the electronic device has entered into the suspend mode of operation. A block 704 uses a touch sensor of the display to detect that an object has contacted the display. In this illustrative embodiment (as is typical of many types of electronic devices), the electronic device automatically exits the suspend mode in response to the display being touched in a specified manner (by a user or another object), as indicated in a block 706. In a block 708, the touch sensor detects each further contact of one or more objects with the display of the electronic device occurring during a predefined unit of time, e.g., a minute. A block 710 then determines the frequency of the contacts, i.e., the number of contacts per unit of time. If a user has intentionally contacted the display with an object such as a finger, hand, or stylus, the frequency of such contacts is likely to be relatively low, for example, less than two contacts per minute—particularly if the electronic device is currently in the suspend mode. Accordingly, a predefined constant F can be selected that is substantially greater than the likely frequency with which a user would contact the display, e.g., four contacts/minute, if the electronic device is not executing such an application, e.g., a game. A decision block 712 can then determine if the frequency of contacts just determined is greater than the predefined constant F. If so, it is likely that the contacts with the display have been by objects not controlled by the user, which might indicate that the display can be damaged by the contacts. A block 720 provides for alerting the user that potential damage to the display may be occurring because of the objects contacting the display. If the frequency of the contacts is not greater than F in decision block 712, a block 714 indicates that the device appears to operating normally, i.e., that the contacts with the display have likely been intentionally caused by the user. The logic then returns to block 702, indicating that the electronic device has again entered the suspend mode of operation due to inactivity (or because the user has manually activated a control to place the electronic device in the suspend mode of operation).

If the electronic device is no longer in suspend mode, but is now executing an application such as a game that might involve a high frequency of contacts with the display by the user's hand, finger(s), or a stylus, then the frequency of such contacts might indeed be higher than the threshold value used to determine if the display is potentially being subjected to damage as a result of contacts by one or more objects. However, further confirmation that potential damage to the display may be occurring if the frequency is greater than F in decision block 712 can be provided as explained above. A block 716 detects light intensity proximate to the electronic device, and a decision block 718 determines if the light intensity is less than the predefined constant I, which is selected to correspond to a light level below which the display cannot be readily used (or at which the controls on the electronic device, such as a keyboard, may not comfortably be perceived by the human eye). Thus, if the light intensity proximate to the electronic device is below that at which an application being executed on the electronic device would readily be visible on the display, confirmation is provided that the frequency of contacts greater than the threshold is the result of potentially damaging contacts by one or more objects that are not controlled by the object. If the response is affirmative, then the alert provided in block 720 is issued. Otherwise, the logic continues back to block 714, to proceed as discussed above.

Several other approaches for detecting potential damage to the display of the electronic device are also contemplated. To simplify the discussion of these alternative approaches, the logic illustrated in FIG. 7 can be employed by appropriately modifying two of the blocks of the Figure. For example, the area of the display screen contacted by an object can be detected in block 710 (instead of the frequency of the contacts discussed above). Decision block 712 can then determine if the area of contact is greater than a predefined threshold. The remaining logic of FIG. 7 discussed above can be carried out without modification, since the other blocks are equally applicable to this alternative approach. In determining the threshold for the area of the display contacted by an object, it should be noted that the threshold can be set to be greater than the total area of, for example, the pads of one or two fingers, or the area of the tip of a stylus that is normally employed by a user to provide touch input to the electronic device by contacting the display screen. However, the choice of the area used for the threshold is not limited to just these two options. In any case, value of the threshold is selected so that an object contacting the display over an area greater than the threshold is not likely to be an object controlled by the user. It is reasonable that such an object might potentially damage the display. In regard to this approach, it is noted that some capacitive touch screens currently do not respond to an input applied over a relatively large area of the display screen, for example, when a touch sensitive device is contacted by a large portion of the user's hand, or by the user's cheek in the case of a cellular phone electronic device being used during a telephone call. Thus, it will be apparent that the detection of a large area of contact can be used for detecting when an object potentially damaging to the display is in contact with the display.

Another alternative illustrative approach for detecting potential damage to the display can be implemented by modifying block 710 to provide for detecting the simultaneous contact of the display by a plurality of objects. For this approach, decision block 712 can be modified to determine if the number of simultaneous contacts is greater than a predefined threshold number. The threshold number can be set conservatively, for example, to be equal to 10, based on the assumption that in some applications, a user might touch the display screen with all ten fingers, so that if 11 simultaneous contacts were detected in block 710, then it is likely that the objects are not being controlled by the user and may potentially damage the display. A less conservative approach would be to set the threshold number of simultaneous contacts to three, since in most cases, the user would use no more than three fingers to contact the display to provide an input. However, the threshold number can be selected to be almost any value greater than one—depending on what is determined to be a normal number of simultaneous contacts. The remaining logic shown in FIG. 7 can be carried out as discussed above when implementing this illustrative embodiment.

Another consideration in the illustrative embodiments discussed above relates to discriminating between a user touching the display to awaken the electronic device from the suspend mode, and the contact of the display by one or more objects that are not controlled by the user and which may potentially damage the display. For some electronic devices, the user can specify a specific gesture, pattern, or other manner of touching the display that will be recognized by the electronic device to terminate the suspend mode. For such an electronic device, discriminating between the user intentionally touching the display in the specified manner so as to awaken the electronic device from the suspend mode and contacts with the display made by objects not controlled by the user is relatively easy. For example, if the specified gesture to awaken the electronic device from the suspend mode is made by the user drawing a fingertip or a stylus along a designated edge of the display, the device will not be awakened if an object contacts the display in other areas or if the point of contact does not move along the designated edge of the display. Instead, such a contact would be treated as being uncontrolled by the user and potentially causing damage to the display as a result of an object contacting the display in that manner. The electronic device would remain in the suspend mode. Many other examples of specified gestures and other types of contacts with the display by the user to awaken the electronic device from the suspend mode that can readily be distinguished from contacts by objects not controlled by the user are also contemplated.

Figure 8:
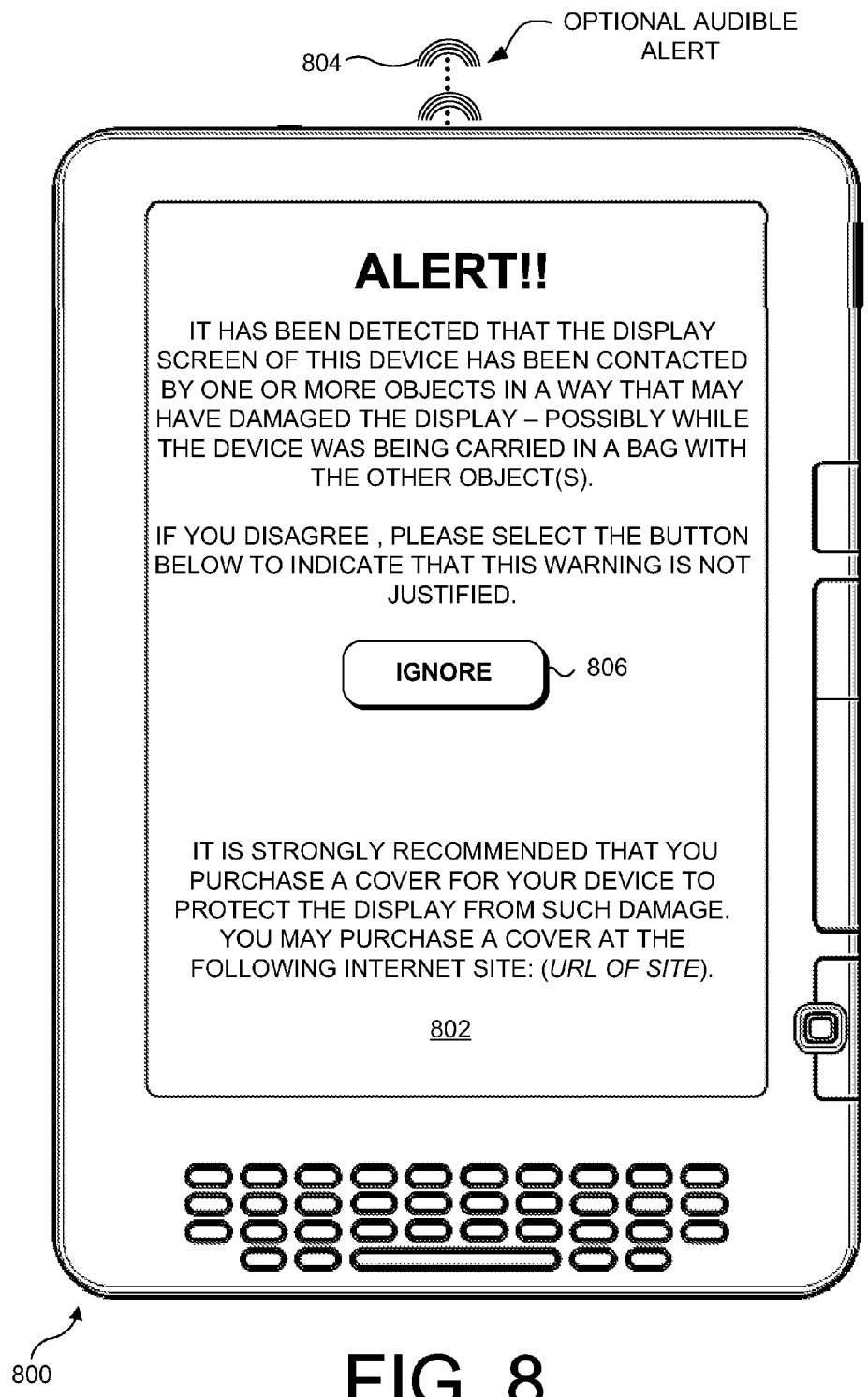
FIG. 8 is an illustrative electronic device on which a user has been alerted as a result about the potentially damaging contact of the display of the electronic device by one or more other objects.

Each of the illustrative embodiments for detecting potential damage to the display discussed above provide for alerting the user about such damage, based upon the characteristic associated with the contact of the display by one or more objects, compared to a predefined constant. FIG. 8 shows an illustrative electronic device 800 having a display 802 on which an example of such an alert is evident. However, it should be noted that if the electronic device is not being used, but is instead disposed within a compartment or pocket of a bag or backpack, simply displaying an alert message such as shown on a display 802 will not serve to alert the user until the user takes the electronic device out of the bag or backpack and views the display. While the message displayed to the user at that time may lead the user to avoid placing the unprotected electronic back within the bag or backpack along with other objects that might damage the display, damage to the display may already have occurred. It would be preferable to alert the user before such damage occurs.

The user might additionally or alternatively be alerted to the potential damage occurring to the display by causing the electronic device to produce an audible alert 804, which can be a loud and distinctive sound that the user will hear—even above the background noise in a vehicle such as an aircraft, train, or automobile. Once the audible alert attracts the user's attention to look at the display of the electronic device, the user will read the textual alert, such as that shown in FIG. 8.

It is herein noted that the alert is provided based on a determination of potential damage to the display, which may not actually have occurred. In some instances, the alert may have been issued without proper cause, if the detection of damage to the display was inappropriate because the user was actually contacting the display with a finger or stylus. Should the user conclude that the alert is unjustified, the user can select an IGNORE control 806, which will at least clear the text alert from the display (and silence the audible alert if it is still energized). It is also contemplated that in response to the user selecting IGNORE, the predefined constant(s) for the characteristic(s) associated with the contact of the display by one or more objects, which led to the alert being issued, might be adjusted to reduce the likelihood of further issuing an inappropriate alert regarding the potential damage to the display by objects contacting it.

Another option for alerting the user about the potential damage to the display caused by one or more other objects contacting it would be to send a text message to the user using the short message service (SMS), or via a chat program, or by sending an email to convey the alert, or by communicating with the user via any other communication channel. The message might be sent to the electronic device that produced it, enabling the user to view the alert message later, or it might instead be sent to another electronic device such as a desktop computer, laptop computer, touch tablet, personal data assistant (PDA), cellular telephone, smart phone, or the like. If the alert text is sent as a message or an email to a different electronic device than the one originating the alert, the user may be able to remove the electronic device for which the alert was produced from the environment in which the contacts with the display are occurring, preventing any further potential damage to the display.

In addition to providing the alert to the user, the text message can recommend that the user purchase a protective cover for the electronic device to prevent further potential damage to the display by objects coming into contact with it. Further, the alert message can provide an Internet address, i.e., a uniform resource location (URL), for a webpage where the user can make such a purchase. The advantage of purchasing an appropriate cover for the display of the electronic device would be that the user might then safely convey the electronic device in a compartment of a bag or backpack, along with other objects, since the cover would prevent the other objects in that environment from contacting the display of the device.

Although the subject matter of the present approach for detecting potential damage to a display of an electronic device by contact with other objects has been described above in language specific to illustrative structural features and/or methodological acts, it is to be understood that many other modifications can be made thereto within the scope of the claims that follow and that the subject matter defined in the appended claims is not necessarily limited to the specific features or acts described herein. Accordingly, the scope of these concepts is not in any way limited by the above description, but instead, the specific features and acts are simply disclosed as illustrative forms of implementing these claims.

In this regard, illustrative embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

What is claimed is:

1. A method, comprising:
    detecting a contact by an object with a display of an electronic device using a touch sensor of the electronic device, wherein the touch sensor produces an output signal in response to the object contacting the display;
    monitoring the output signal from the touch sensor to determine, at least in part, at least one characteristic including one or more of:
        a number of times that subsequent output signals are detected during a period of time; or
        a duration of the contact with the display by the object;
    monitoring at least one condition of the electronic device, wherein the at least one condition comprises one or more of an orientation of the electronic device, a movement of the electronic device, or a geographical position of the electronic device;
    determining that the contact by the object has caused possible damage to the display, based at least in part on a comparison of the at least one characteristic to a corresponding threshold for the at least one characteristic and that the at least one condition is inconsistent with the electronic device being used for an intended purpose;
    causing an alert indicative of the possible damage to the display by the object;
    receiving a user input associated with the alert indicative of the possible damage to the display, the user input indicating the alert is to be ignored; and
    determining an adjusted threshold value based at least in part on the corresponding threshold value and the user input.

2. The method of claim 1, further comprising:
    monitoring an illumination level proximate to the electronic device;

determining that the illumination level is below an intensity threshold; and
causing an alert signal.

3. A method, comprising:
detecting a contact by one or more objects with a display of an electronic device;
determining, based at least in part on a threshold value, that the contact with the display by the one or more objects is inconsistent with an intended use of the electronic device, wherein the threshold value is determined based at least in part on an accumulation of prior use data;
monitoring at least one condition of the electronic device, wherein the at least one condition comprises one or more of an orientation of the electronic device, a movement of the electronic device, or a geographical position of the electronic device;
causing an alert indicating that the display is at risk of being damaged by the contact with the one or more objects, based at least in part on determining that the contact with the display by the one or more objects is inconsistent with the intended use and that the at least one condition is inconsistent with the electronic device being used for the intended use;
receiving a user input indicating that the alert is to be ignored; and
increasing the threshold value based at least in part on the user input indicating that the alert is to be ignored.

4. A method, comprising:
detecting, using a touch sensor of a display of an electronic device, a contact by an object with the display of the electronic device and in response to the contact, producing an output signal from the touch sensor that is indicative of the contact;
based at least in part upon the output signal from the touch sensor, determining at least one characteristic associated with the contact by the object with the display of the electronic device;
determining that the at least one characteristic has exceeded a threshold value;
monitoring at least one condition of the electronic device, wherein the at least one condition comprises one or more of an orientation of the electronic device, a movement of the electronic device, or a geographical position of the electronic device;
determining that the at least one condition is inconsistent with the electronic device being used for an intended purpose;
causing an alert indicating potential damage to the display by the object;
receiving a user input indicating the potential damage to the display by the object, the user input indicating the alert is to be ignored; and
determining an adjusted threshold value based at least in part on at least one of the user input or an accumulation of prior use data.

5. The method of claim 4, wherein determining the at least one characteristic comprises determining a number of times subsequent output signals are detected during a period of time.

6. The method of claim 4, wherein determining the at least one characteristic comprises determining an intensity of the contact.

7. The method of claim 4, wherein determining the at least one characteristic comprises determining an area of the contact on the display.

8. The method of claim 4, wherein determining the at least one characteristic comprises determining a number of simultaneous contacts of the display by a plurality of objects that includes the object.

9. The method of claim 4, wherein determining the at least one characteristic comprises determining a duration of the contact by the object with the display of the electronic device.

10. The method of claim 4, further comprising:
monitoring an illumination level proximate to the electronic device; and
determining that the illumination level is below a threshold;
and wherein the causing the alert occurs at least partly in response to determining that the illumination level is below the threshold.

11. The method of claim 4, wherein the alert indicating the potential damage to the display comprises at least one of:
a message on the display of the electronic device that indicates the contact by the object with the display in a manner that suggests potential damage to the display;
an audible sound produced with the electronic device to alert a user to access the electronic device;
a text message transmitted to a receiving device that is accessible by the user, the text message indicating that the contact by the object with the display was in a manner that suggests potential damage to the display; or
an email transmitted to the user indicating the contact by the object with the display was in a manner that suggests potential damage to the display.

12. The method of claim 4, wherein the touch sensor is sensitive to infrared energy and uses the infrared energy to distinguish between the contact being made by inanimate objects and animate objects.

13. An electronic device, comprising:
a memory storing machine executable instructions; and
one or more processors coupled to a display of an electronic device and to the memory, the one or more processors executing the machine executable instructions stored in the memory to implement a plurality of functions, including:
differentiating between a contact to the display by an animate object and an inanimate object;
determining at least one characteristic of the contact by the inanimate object with the display;
determining that the at least one characteristic exceeds a threshold value;
monitoring at least one condition of the electronic device, wherein the at least one condition comprises one or more of an orientation of the electronic device, a movement of the electronic device, or a geographical position of the electronic device;
determining that the at least one condition is inconsistent with the electronic device being used for an intended purpose;
causing an alert indicating a potential damage to the display due to the contact of the inanimate object with the display;
receiving a user input associated with the alert, the user input indicating the alert is to be ignored; and
determining an adjusted threshold value based at least in part on the user input.

14. The electronic device of claim 13, wherein the one or more processors executing the machine executable instructions determine the at least one characteristic as including a number of times that output signals are detected in response to the contact by the inanimate object within a period of time.

15. The electronic device of claim 13, wherein the one or more processors executing the machine executable instructions determine the at least one characteristic as including an intensity of the contact.

16. The electronic device of claim 13, wherein the one or more processors executing the machine executable instructions determine the at least one characteristic as including a duration of the contact by the inanimate object with the display of the electronic device.

17. The electronic device of claim 13, wherein the one or more processors executing the machine executable instructions determine the at least one characteristic as including an area of the contact on the display.

18. The electronic device of claim 13, wherein the one or more processors executing the machine executable instructions determine the at least one characteristic as including a number of simultaneous contacts with the display by a plurality of inanimate objects that include the inanimate object.

19. The electronic device of claim 13, further comprising a gyroscope to detect the at least one condition of the electronic device.

20. The electronic device of claim 13, further comprising an accelerometer to detect a movement of the electronic device, wherein execution of the machine executable instructions causes the one or more processors to cause the alert indicating the potential damage to the display based at least in part on a determination that, in addition to the at least one characteristic exceeding the adjusted threshold value, the movement of the electronic device is inconsistent with the electronic device being used for the intended purpose.

21. The electronic device of claim 13, further comprising a light sensor for monitoring an illumination level proximate to the electronic device while a touch sensor detects each contact of another object with the display, wherein execution of the machine executable instructions causes the one or more processors to cause the alert indicating the potential damage to the display based at least in part on a determination that, in addition to the at least one characteristic exceeding the adjusted threshold value, the illumination level proximate to the electronic device is below a threshold at which an image on the display would not be visible or legible.

22. The electronic device of claim 13, further comprising a global position satellite system receiver to receive global position satellite signals wherein execution of the machine executable instructions causes the one or more processors to cause the alert indicating the potential damage to the display based at least in part on a determination that, in addition to the characteristic exceeding the adjusted threshold value, the electronic device is located at the geographical position, or is moving at a speed at which a use for which the electronic device is intended is unlikely.

23. The electronic device of claim 13, wherein execution of the machine executable instructions causes the one or more processors to produce the alert by implementing at least one of:

displaying a message on the display of the electronic device that indicates the contact with the display by the inanimate object in a manner that suggests potential damage to the display;

producing an audible sound with the electronic device to alert a user of the electronic device to access the electronic device;

transmitting a text message to a receiving device that is accessible by the user, the text message indicating that the contact by the inanimate object with the display suggests potential damage to the display; or transmitting an email to the user indicating that the contact by the inanimate object with the display suggests potential damage to the display.

24. The electronic device of claim 13, wherein the differentiating comprises sensing.

25. The electronic device of claim 13, wherein the machine instructions executed by the one or more processors cause the one or more processors to respond to an output signal from a touch sensor to determine that the output signal is a result of the contact by the inanimate object and to determine the at least one characteristic associated with the contact between the inanimate object and the display, while the electronic device is in a suspend mode of operation.

26. One or more non-transitory computer-readable media storing computer executable instructions that, when executed, cause one or more processors of an electronic device having a display to perform a plurality of functions, including:

detecting a contact by one or more inanimate objects with the display;

determining that the contact with the display by the one or more inanimate objects is inconsistent with an intended use of the electronic device;

monitoring at least one condition of the electronic device, wherein the at least one condition comprises one or more of an orientation of the electronic device, a movement of the electronic device, or a geographical position of the electronic device;

determining that the at least one condition is inconsistent with the electronic device being used for an intended purpose;

causing an alert indicating a potential damage to the display by the contact with the one or more inanimate objects;

receiving a user input indicating that the alert is to be ignored; and determining an adjusted threshold value associated with the intended use of the electronic device based at least in part on the user input.

27. One or more non-transitory computer-readable media storing computer executable instructions that, when executed, cause one or more processors to perform a plurality of functions, including:

determining at least one characteristic associated with a contact by an object with a display of an electronic device;

determining that the at least one characteristic has exceeded a threshold value, the threshold value being determined based at least in part on an accumulation of prior use data associated with a user of the electronic device, the prior use data including at least one of a past duration of contact of the display, a past contact intensity, or a number of times the display has previously been touched over a period of time;

monitoring at least one condition of the electronic device, wherein the at least one condition comprises one or more of an orientation of the electronic device, a movement of the electronic device, or a geographical position of the electronic device;

determining that the at least one condition is inconsistent with the electronic device being used for an intended purpose; and causing an alert indicative of a potential damage to the display by the object.

28. The one or more non-transitory computer-readable media of claim 27, wherein determining the at least one characteristic comprises determining a number of times that output signals are detected in response to the contact by the object within a period of time.

29. The one or more non-transitory computer-readable media of claim 27, wherein determining the at least one characteristic comprises determining an intensity of the contact.

30. The one or more non-transitory computer-readable media of claim 27, wherein determining the at least one characteristic comprises determining a duration of the contact by the object with the display of the electronic device.

31. The one or more non-transitory computer-readable media of claim 27, wherein determining the at least one characteristic comprises determining an area of the contact on the display.

32. The one or more non-transitory computer-readable media of claim 27, wherein determining the at least one characteristic comprises determining a number of simultaneous contacts of the display by a plurality of objects that includes the object.

33. The one or more non-transitory computer-readable media of claim 27, wherein the plurality of functions further include monitoring an illumination level at the display while detecting the contact of the object with the display, and wherein the causing the alert is implemented based at least in part on a determination that, in addition to the at least one characteristic exceeding the threshold value, the illumination level at the display is below a threshold value.

34. The one or more non-transitory computer-readable media of claim 27, wherein the monitoring the at least one condition comprises using global position satellite signals that are received by the electronic device, and wherein the causing the alert is implemented based at least in part on a determination that, in addition to the least one characteristic exceeding the threshold value, the electronic device is located at the geographical position, or is moving at a speed at which a use for which the electronic device is intended is unlikely.

35. The one or more non-transitory computer-readable media of claim 27, wherein the alert indicative of the potential damage to the display comprises at least one of:
a message displayed on the display of the electronic device that indicates the contact by the object was in a manner that suggests potential damage to the display;
an audible sound produced with the electronic device to alert a user to access the electronic device;
a text message transmitted to a receiving device that is accessible by the user, the text message indicating that the contact to the display of the electronic device was in a manner that suggests potential damage to the display; and
an email transmitted to the user indicating that the contact to the display of the electronic device was in a manner that suggests potential damage to the display.

* * * * *